US008835533B2

(12) United States Patent
Zhu et al.

(10) Patent No.: US 8,835,533 B2
(45) Date of Patent: Sep. 16, 2014

(54) THERMALLY RESISTANT ANAEROBICALLY CURABLE COMPOSITIONS

(75) Inventors: Qinyan Zhu, Cheshire, CT (US); Shabbir Attarwala, Simsbury, CT (US)

(73) Assignee: Henkel US IP LLC, Rocky Hill, CT (US)

( * ) Notice: Subject to any disclaimer, the term of this patent is extended or adjusted under 35 U.S.C. 154(b) by 553 days.

(21) Appl. No.: 12/578,748

(22) Filed: Oct. 14, 2009

(65) Prior Publication Data

US 2010/0086796 A1 Apr. 8, 2010

Related U.S. Application Data

(63) Continuation of application No. PCT/US2008/012197, filed on Oct. 28, 2008.

(60) Provisional application No. 60/983,351, filed on Oct. 29, 2007.

(51) Int. Cl.
| | | |
|---|---|---|
| C09J 4/00 | (2006.01) | |
| C09J 201/00 | (2006.01) | |
| C09J 133/14 | (2006.01) | |
| C08K 5/42 | (2006.01) | |
| C08K 5/00 | (2006.01) | |
| C08K 3/16 | (2006.01) | |
| C08K 3/36 | (2006.01) | |
| C08K 5/46 | (2006.01) | |
| C08L 23/06 | (2006.01) | |
| C08K 5/23 | (2006.01) | |

(52) U.S. Cl.
CPC .................. *C09J 133/14* (2013.01); *C08K 5/42* (2013.01); *C08K 5/0025* (2013.01); *C08K 3/16* (2013.01); *C08K 3/36* (2013.01); *C08K 5/46* (2013.01); *C08L 23/06* (2013.01); *C08K 5/23* (2013.01)
USPC ........... 523/176; 524/531; 524/533; 524/534; 524/535; 525/259; 525/261; 525/278; 525/284; 525/288; 525/291; 525/293; 525/298; 525/302; 525/304; 525/330.3

(58) Field of Classification Search
USPC .......... 523/176; 524/401, 418, 423, 434, 436, 524/531, 533, 534, 535; 525/330.3, 259, 525/261, 278, 284, 288, 291, 293, 298, 302, 525/304
See application file for complete search history.

(56) References Cited

U.S. PATENT DOCUMENTS

| | | | |
|---|---|---|---|
| 3,218,305 A | | 11/1965 | Krieble |
| 3,419,512 A | * | 12/1968 | Lees et al. ..................... 524/381 |
| 3,851,017 A | * | 11/1974 | Werber ......................... 525/284 |
| 3,988,299 A | | 10/1976 | Malofsky |
| 4,180,640 A | | 12/1979 | Melody |
| 4,287,330 A | | 9/1981 | Rich |
| 4,321,349 A | | 3/1982 | Rich |
| 4,413,108 A | | 11/1983 | Janssen |
| 4,447,588 A | | 5/1984 | Rametta |
| 4,500,608 A | | 2/1985 | Rametta |
| 4,528,059 A | | 7/1985 | Janssen |
| 4,990,281 A | | 2/1991 | Clark |
| 5,523,347 A | | 6/1996 | Kneafsey et al. |
| 5,605,999 A | | 2/1997 | Chu |
| 5,811,473 A | | 9/1998 | Ramos |
| 5,932,638 A | | 8/1999 | Righettini et al. |
| 6,043,327 A | * | 3/2000 | Attarwala et al. ............ 526/259 |
| 6,150,479 A | | 11/2000 | Klemarczyk |
| 6,342,545 B1 | | 1/2002 | Klemarczyk |
| 6,583,289 B1 | | 6/2003 | McArdle |
| 6,632,908 B1 | | 10/2003 | Maandi |
| 6,800,671 B1 | | 10/2004 | Montgomery et al. |
| 6,835,762 B1 | | 12/2004 | Kelmarczyk |
| 6,852,778 B1 | * | 2/2005 | Kusuyama ..................... 523/176 |
| 6,897,277 B1 | | 5/2005 | Klemarczyk |
| 6,958,368 B1 | | 10/2005 | Klemarczyk |
| 2005/0239952 A1 | * | 10/2005 | Attarwala et al. ............ 524/556 |

FOREIGN PATENT DOCUMENTS

WO      WO 0151576      7/2001

OTHER PUBLICATIONS

EP Search Report, dated Sep. 21, 2011, 4 pages.
Rich, R.D., "Anaerobic Adhesives," *Handbook of Adhesives Technology*, (1994), 29, 467-79, Marcel Dekker, Inc., New York.
Baccei, L.J., Malofsky, B.M., "Anaerobic Adhesives Containing Maleimides Having Improved Thermal Resistance," *Adhesive Chemicals*, (1984), 589-641, Plenum Publishing Corp.
International Search Report dated Jun. 25, 2009 for International Application No. PCT/US2008/02197.

\* cited by examiner

*Primary Examiner* — David W Wu
*Assistant Examiner* — Marie Reddick
(74) *Attorney, Agent, or Firm* — Steven C. Bauman

(57) ABSTRACT

The present invention relates to anaerobically curable compositions demonstrating resistance to elevated temperature conditions.

10 Claims, No Drawings

THERMALLY RESISTANT ANAEROBICALLY CURABLE COMPOSITIONS

RELATED U.S. APPLICATION DATA

This application continues from International Patent Application No. PCT/US2008/012197, filed Oct. 28, 2008, which claims the benefit of an earlier filing date from U.S. Provisional Application No. 60/983,351, filed Oct. 29, 2007 the disclosures of each of which hereby being expressly incorporated herein by reference.

BACKGROUND OF THE INVENTION

1. Field of the Invention

The present invention relates to anaerobically curable compositions demonstrating resistance to elevated temperature conditions.

2. Brief Description of Related Technology

Anaerobic adhesive compositions generally are well-known. See e.g., R. D. Rich, "Anaerobic Adhesives" in *Handbook of Adhesive Technology*, 29, 467-79, A. Pizzi and K. L. Mittal, eds., Marcel Dekker, Inc., New York (1994), and references cited therein. Their uses are legion and new applications continue to be developed.

Conventional anaerobic adhesives ordinarily include a free-radically polymerizable acrylate ester monomer, together with a peroxy initiator and an inhibitor component. Oftentimes, such anaerobic adhesive compositions also contain accelerator components to increase the speed with which the composition cures.

Many adhesives particularly anaerobic adhesives, have been rendered resistant to degradation at elevated temperatures by the inclusion of certain additives. For instance, U.S. Pat. No. 3,988,299 (Malofsky) refers to a heat curable composition having improved thermal properties, which includes certain acrylate monomers and maleimide compounds.

L. J. Baccei and B. M. Malofsky, "Anaerobic Adhesives Containing Maleimides Having Improved Thermal Resistance" in *Adhesive Chemicals*, 589-601, L-H, Lee, ed., Plenum Publishing Corp. (1984) report the use of maleimides—specifically, N-phenyl maleimide, m-phenylene dimaleimide and a reaction product of methylene dianiline and methylene dianiline bismaleimide—to increase the thermal resistance of anaerobic adhesives which are fully cured at temperatures of at least 150° C.

While the addition to anaerobic adhesive compositions of such maleimide compounds to render them resistant to thermal degradation provides reaction products with acceptable performance, it would be desirable to find alternative compounds to include in such formulations.

Henkel Corporation in the past designed certain anaerobic adhesive compositions with enhanced resistance to thermal degradation. For instance, U.S. Pat. No. 6,342,545 (Klemarczyk) discloses and claims a radical curable composition, radical cured reaction products of which demonstrate improved adhesion and resistance to thermal degradation at elevated temperatures. The composition, which may cure under anaerobic conditions, includes (a) a (meth)acrylate component; (b) an effective amount of latent imidazole as a thermal resistance conferring agent; and (c) a radical cure-inducing composition, such as an anaerobic cure-inducing composition. The latent imidazole is an adduct obtained by a reacting a compound having an active hydrogen together with a tertiary amino group, an epoxy compound and a carboxcylic acid anhydride. And the thermal resistance-conferring agent is selected from methyl imidizole, benzoyl imidizole, benzoyl methylimidizole, phthaloyl diimidizole and combinations thereof.

U.S. Pat. No. 6,150,479 (Klemarczyk) also discloses and claims a radical curable composition, radical cured reaction products of which demonstrate improved adhesion and resistance to thermal degradation at elevated temperatures. The composition, which may cure under anaerobic conditions, includes (a) a (meth)acrylate component; (b) a coreactant component of certain structures, examples of which include epoxidized citronellyl acrylate; epoxidized citronellyl methacrylate; cyclohexenyl methanol acrylate; cyclohexenyl methanol methacrylate; epoxidized cyclohexenyl methanol methacrylate; dihydrodicyclopentadienyl acrylate; epoxidized dihydrodicyclopentadienyl acrylate; dihydrodicylopentadienyl methacrylate; epoxidized dihydrodicylopentadienyl methacrylate; epoxidized 2-propenoic acid, 2-[(3a,3,4,5,6,7,7a-hexahydro-4,7-methano-1H-indenyl)oxy]ethyl ester; epoxidized 2-propenoic acid, 2-methyl-, 2-[(3a,3,4,5,6,7,7a-hexahydro-4,7-methano-1H-indenyl)oxy]ethyl ester and combinations thereof; and (c) a radical cure-inducing composition, such as an anaerobic cure-inducing composition. Here, the presence of the coreactant in the composition provides radical cured reaction products thereof with improved adhesion and resistance to thermal degradation. The compositions may also include a thermal resistance-conferring agent, such as one selected from imidizole derivatives (such as benzoyl imidizole, methyl imidizole, benzoyl methylimidizole, phthaloyl diimidizole and combinations thereof), latent imidizoles, and an adduct obtained by reacting a compound having an active hydrogen together with a tertiary amino group in the molecule, an epoxy compound and a carboxylic acid anhydride.

Henkel also has sold and continues to sell a product called PST with boric acid (Item No. 190901), which has among other components about 1-5% of boric acid.

Despite the state of the art, there is an on-going search for additives to improve the thermal performance of reaction products of radical-curable adhesives, such as anaerobically curable ones.

SUMMARY OF THE INVENTION

The inventive anaerobic curable composition, includes a (meth)acrylate component; an anaerobic cure system; and a compound of a Group IA or Group IIA element and a halogen, sulfate or sulfonate. Optionally, the inventive anaerobic curable composition includes a polyolefin, a halogenated polyolefin and a combination thereof.

Desirably, the compound is of a Group IIA element being calcium and the halogen being fluorine.

In one embodiment the polyolefin is present and is selected from polyethylene, polypropylene, polybutylenes and copolymers and combinations thereof.

In another embodiment the halogenated polyolefin is present and is selected from halogenated polyethylenes, halogenated polypropylenes, halogenated polybutylenes and copolymers and combinations thereof. Desirably, the halogen of the halogentaed polyolefin is fluorine.

In one commercial application, the inventive compositions are useful as anaerobic pipe sealants and due to the inclusion of the compound of a Group IIA element and a halogen (such as calcium fluoride) and optionally polyethylene and or polytetrafluorothelene polymers gives the compositions excellent sealability at elevated temperature conditions and preventing the pipe seizing. Compositions with calcium fluoride demonstrated better sealability in comparison with the ones without calcium fluoride. The inventive compositions here not only seal and lock pipes at room temperature, they seal pipes at high temperature.

This invention also provides methods of preparing and using the inventive anaerobic curable compositions as well as reaction products of the inventive anaerobic curable compositions.

The present invention will be more fully appreciated by a reading of the "Detailed Description of the Invention", and the illustrative examples which follow thereafter.

DETAILED DESCRIPTION OF THE INVENTION

The inventive anaerobic curable composition, includes a (meth)acrylate component; an anaerobic cure system; and a compound of a Group IA or Group IIA element and a halogen, sulfate or sulfonate. Optionally, the inventive anaerobic curable composition includes a polyolefin, a halogenated polyolefin and a combination thereof. Desirably, the compound is of a Group IIA element being calcium and the halogen being fluorine.

The (meth)acrylate component may be chosen from a host of materials, such as those represented by $H_2C=CGCO_2R^1$, where G may be hydrogen, halogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Additional (meth)acrylate monomers suitable for use herein include polyfunctional (meth)acrylate monomers, such as, but not limited to, di- or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein by reference.

Of course, combinations of these (meth)acrylate monomers may also be used.

The (meth)acrylate component should comprise from about 10 to about 75 weight percent of the composition, such as about 20 to about 60 weight percent, such as about 25 to about 50 weight percent, based on the total weight of the composition.

The compound of a Group IA or Group IIA element and a halogen, sulfate or sulfonate should be stable under elevated temperature conditions, so as to confer that property to the inventive compositions.

The compound of a Group IA or Group IIA element and a halogen, sulfate or sulfonate should be present in the inventive composition in an amount within the range of about 10 weight percent to about 50 weight percent, such as about 15 weight percent to about 40 weight percent, for instance about 25 weight percent to about 35 weight percent, based on the total weight of the composition.

The compound may have Group IA elements, such as lithium, sodium or potassium, or Group IIA elements, such as calcium, barium, magnesium or strontium.

In addition, the compounds may have halogens, such as fluorine, or sulfates or sulfonates.

And polyolefins, whether halogenated or not, may also be included. Indeed, polyolefins and halogenated polyolefins may be included, desirably in combination.

Among the polyolefins that may be included in the inventive compositions are polyethylenes, polypropylenes, polybutylenes and copolymers and combinations thereof. Halogenated versions of these polyolefins include for instance fluorinated polyethylene, such as poly(tetrafluoroethylene) are particularly desirable.

The polyolefins, whether halogenated or not, should be present in the inventive composition in an amount within the range of about 2 weight percent to about 30 weight percent, such as about 10 weight percent to about 25 weight percent, for instance about 20 weight percent, based on the total weight of the composition. The polyolefin should be present in an amount of at least 2 weight percent, with the balance (to the extent there is one) being a halogenated polyolefin.

The polyolefin is provided in the form of a particulate material or powder. The polyolefin powder will generally have an average particle size of about 0.1 to about 50 microns. Desirably, the polyolefin powder has an average particle size of about 20 microns. Polyolefin powders suitable for use in the inventive compositions typically have a melting point in the range from about 75° C. to about 175° C. When the inventive compositions have reached a temperature above the melting point of the polyolefin powder used therein, the polyolefin powder will typically be substantially dissolved in the inventive composition. A commercially available polyethylene powder suitable for the present invention are those sold under the trade name Microthene® by Equistar Chemical Company, with average densities ranging from 0.909 to 0.952 g/cc. Desirably, the polyolefin powder is Microthene® FN 510-00. The polyolefin powder is comprised of a polyolefin containing repeating units of at least one $C_2$ to $C_7$ alkene monomer.

A wide variety of halogenated polyolefins, such as perfluorinated hydrocarbon polymers, are available commercially, for example, from DuPont under the tradename "Teflon". Such perfluorinated hydrocarbon polymers are typically characterized as having a particle size in the range of about 0.1 up to about 100 um, a surface area in the range of about 0.2 up to about 20 $g/m^2$, and a bulk density of at least 100 g/L. In addition, or alternatively, such perfluorinated hydrocarbon polymers are characterized as having an average bulk density in the range of about 250-500 g/L, a melting peak temperature (as determined by ASTM D1457) of 325+/−5° C., an average particle size distribution in the range of about 8-15 um, a specific surface area in the range of about 8-12 $m^2/g$, and a relatively narrow molecular weight distribution.

Desirable anaerobic cure systems to induce and accelerate cure of the inventive compositions may include saccharin, toluidines, such as N,N-diethyl-p-toluidine ("DE-p-T") and N,N-dimethyl-o-toluidine ("DM-o-T"), acetyl phenylhydrazine ("APH"), maleic acid, and stabilizers like quinones, such as napthaquinone and anthraquinone. See e.g. U.S. Pat. No. 3,218,305 (Krieble), U.S. Pat. No. 4,180,640 (Melody), U.S. Pat. No. 4,287,330 (Rich) and U.S. Pat. No. 4,321,349 (Rich).

In addition to the components listed in the preceding paragraph as constituents of anaerobic cure-inducing compositions, more recently Henkel Corporation has discovered a series of anaerobic cure accelerators, some of which are set forth below:

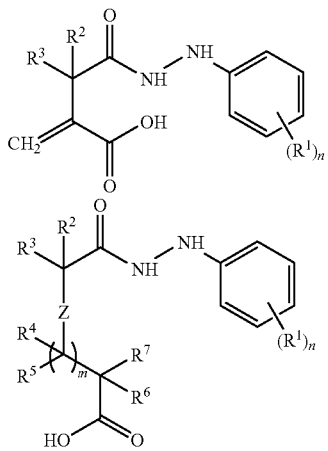

where $R^1$-$R^7$ are each independently selected from hydrogen or $C_{1-4}$; Z is a carbon-carbon single bond or carbon-carbon double bond; m is 0 or 1; and n is an integer between 1 and 5;

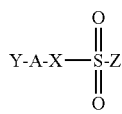

where Y is an aromatic ring, optionally substituted at up to five positions by $C_{1-6}$ alkyl or alkoxy, or halo groups; A is C=O, S=O or O=S=O; X is NH, O or S and Z is an aromatic ring, optionally substituted at up to five positions by $C_{1-6}$ alkyl or alkoxy, or halo groups, or Y and Z taken together may join to the same aromatic ring or aromatic ring system, provided that when X is NH, o-benzoic sulfimide is excluded therefrom;

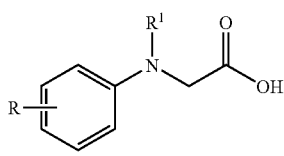

where R is hydrogen, halogen, alkyl, alkenyl, hydroxyalkyl, hydroxyalkenyl, carboxyl, or sulfonato, and $R^1$ is as defined above and alkenyl, hydroxyalkyl, hydroxyalkenyl, or aralkyl. See U.S. Pat. Nos. 6,835,762, 6,897,277 and 6,958,368.

In addition, Loctite (R&D) Ltd. designed anaerobically curable compositions using the following trithiadiaza pentalenes as a cure accelerator:

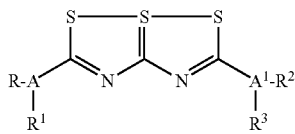

where A and $A^1$ may be selected from 0 and N; and

R, $R^1$, $R^2$ and $R^3$ may be the same or different, are as defined above and cycloalkyl, cycloalkenyl, and aryl, having from 1 to about 30 carbon atoms, and may be substituted or interrupted with a heteroatom, and heterocyclic structures, or $R^1$ and $R^3$ taken together may join to form a cyclic structure having from about 20 to about 28 ring atoms, and together represent dialkyl substituted polyether structures that may be substituted or interrupted with the trithiadiaza pentalene structure, which itself may or may not be substituted by $A^1$, $R^2$, or $R^3$, as defined above. See U.S. Pat. No. 6,583,289 (McArdle).

Triazine/thiol anaerobic cure systems may also be used in the practice of the present invention. For instance, U.S. Pat. Nos. 4,413,108, 4,447,588, 4,500,608 and 4,528,059, each speak to such a system, and the entirety of each of which is hereby expressly incorporated herein by reference.

The inventive compositions may also include other conventional components, such as metal catalysts, like iron and copper. Metal catalysts are generally undesirable in one-part anaerobic formulations (hence the use of sequestering agents to precipitate metals). In two-part anaerobic formulations, metal catalysts may be added to part of the formulation that does not contain an initiator, such as a peroxy compound.

A number of well-known initiators of free radical polymerization are typically incorporated into the inventive compositions including, without limitation, hydroperoxides, such as CHP, para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

The anaerobic cure system may be used in amounts of about 0.1 to about 10 weight percent, such as about 1 to about 5 weight percent, based on the total weight of the composition.

Additional components have been included in traditional anaerobic curable compositions to alter the physical properties of either the curable compositions or the reaction products thereof. For instance, thickeners, non-reactive plasticizers, fillers, toughening components (such as elastomers and rubbers), and other well-known additives may be incorporated therein where the art-skilled person believes it would be desirable to do so.

The present invention also provides methods of preparing and using the inventive anaerobic adhesive compositions, as well as reaction products of the compositions.

The compositions of the present invention may be prepared using conventional methods which are well known to those persons of skill in the art. For instance, the components of the inventive compositions may be mixed together in any convenient order consistent with the roles and functions the components are to perform in the compositions. Conventional mixing techniques using known apparatus may be employed.

The compositions of this invention may be applied to a variety of substrates to perform with the desired benefits and advantages described herein. For instance, appropriate substrates may be constructed from steel, brass, copper, aluminum, zinc, glass and other metals and alloys, ceramics and thermosets. The inventive compositions may have beneficial properties making them suitable for use in gasketing and composite applications. The compositions of this invention demonstrate particularly good bond strength on steel and aluminum. An appropriate primer may be applied to a surface of the chosen substrate to enhance the cure rate of the inventive compositions. See e.g. U.S. Pat. No. 5,811,473 (Ramos).

The invention also provides a process for preparing a reaction product from the anaerobic adhesive composition of the present invention, steps of which include applying the composition to a desired substrate surface and exposing the composition to an anaerobic environment for a time sufficient to cure the composition.

In view of the above description of the present invention, it is clear that a wide range of practical opportunities is provided. The following examples are provided for illustrative purposes only, and are not to be construed so as to limit in any way the teaching herein.

EXAMPLES

Example 1

In Table 1 below, three samples are presented, with Sample No. 1 acting as a control for Sample Nos. 2 and 3, and Sample Nos. 2-4 being versions of embodiments of the present invention.

TABLE 1

| Component | | Sample No./Amt (wt %) | | | |
|---|---|---|---|---|---|
| Type | Identity | 1 | 2 | 3 | 4 |
| (Meth)acrylate | PEGMA | 23 | 23 | 23 | 0 |
|  | EBIPMA | 0 | 0 | 0 | 35 |
| Plasticizer | UNIFLEX 330 | 24 | 24 | 24 | 10 |
| Anaerobic cure system | DEpT/CHP/ Naphthaquinone | 3 | 3 | 3 | 3 |
| Polyolefin | PE powder | 0 | 3 | 20 | 22 |
| Fluorinated polyolefin | Teflon powder | 46 | 17 | 0 | 0 |
| Thickener | AEROSIL | 4 | 0 | 4 | 3.5 |
| Compound of Group IIA element and halogen | CaF$_2$ | 0 | 30 | 26 | 26 |

The components were mixed in any convenient order, and then used as set forth below. The sealability evaluation on these samples was performed in accordance with ASTM D6396-99, which is entitled "Sealability and Heat Aging Test". Thus, ⅜" malleable steel pipe tees and steel pie plugs were used. The samples were applied to the second through the sixth threads of the male fitting for each test joint, ensuring that the average height of the samples reached the thread crown and the samples completely wets the thread roots. Using a torque wrench, two sample-coated pipe plugs were installed for each tee, applying 240 in-lbs (27.2 Nm) of torque. The so formed assemblies were cured at room temperature for a period of time of at least 24 hours. The pipe tee sealability test clamp was attached to the assembly and submerged in a water bath. The assembly was pressurized to 100 psi (0.7 Mpa) for a period of time of 5 minutes, and the presence or absence of any observed leak paths at each test joint was noted. The pressure was then released to bring the assembly back to atmospheric pressure.

For heat aging, the assemblies were placed in temperature chambers for the time and temperature specified in Tables 2 and 3, and the assemblies were removed from the temperature chambers and allowed to return to room temperature. At this point, each assembly was evaluated for sealability under 100 psi air pressure.

With reference to Table Nos. 2 and 3 below, it may be seen that Sample No. 1 failed to seal against air passing through the pipe at 100 psi, after curing the sample under room temperature conditions for 24 hours followed by heat aging at either 200° C. or 233° C. for 24 hours or 1 week. In contrast, each of Sample Nos. 2 and 3 sealed against air passing through the pipe at 100 psi, after curing under the same conditions. In addition, Sample No. 4 sealed against air passing through the pipe at 100 psi, after curing under the same conditions.

TABLE 2

| Sample No. | Sealability 100 psi air; RTC 24 hrs, heat aged at 200° C. 24 hrs | Sealability 100 psi air; RTC 24 hrs, heat aged at 200° C. 1 wk |
|---|---|---|
| 1 | Leak | Leak |
| 2 | Pass | Pass |
| 3 | Pass | Pass |
| 4 | Pass | Pass |

TABLE 3

| Sample No. | Sealability 100 psi air; RTC 24 hrs, heat aged at 233° C. 24 hrs | Sealability 100 psi air; RTC 24 hrs, heat aged at 233° C. 1 wk |
|---|---|---|
| 1 | Leak | Leak |
| 2 | Pass | Pass |
| 3 | Pass | Pass |
| 4 | Pass | Pass |

Example 2

Here, we evaluated Sample No. 3 against LOCTITE PST 567 to determine relative sealability at two different elevated temperatures (280° C. and 350° C.) at a three day exposure to such temperatures. LOCTITE PST 567 contains bisphenol A fumarate resin (30-60 weight percent), polyglycol dimethacrylate (10-30 weight percent), polyglycol laurate (10-30 weight percent), polyethylene glycol monococoate (10-30 weight percent), poly(tetrafluoroethylene) (5-10 weight percent), titanium dioxide (1-5 weight percent), silica (1-5 weight percent) and saccharin (1-5 weight percent).

The steam resistance evaluation on these samples was performed in accordance with ASTM D6396-99, which is entitled "Steam Resistance Test". Thus, ½" forged black steel thread pipe fitting couplings, ½" forged black steel thread pipe fitting Hex-head plugs, ½" black steel thread pipe nipple thread ends, and ½" forged black steel thread pipe fitting caps were used in "as received" condition and were assembled with the samples between the joints. The assemblies were thus formed into ½" pipe bombs with 3 test joints/bomb. About 7 grams of water was added to the assembly before capping off and tightening. The bombs were cured at room temperature for a period of time of at least 24 hours, after which each assembly was weighed. The assemblies were then placed in pressured pots and the pots placed in temperature chambers. After the noted time intervals, the assemblies were removed from the temperature chamber and allowed to cool to room temperature, at which point the assemblies were weighed again.

The results are captured below in Tables 4 and 5.

TABLE 4

| Sample No. | Steam Weight Loss ½" Forged Steel Bombs, 3 days @ 280° C. (grams) | % Steam Weight Loss ½" Forged Steel Bombs, 3 days @ 280° C. |
|---|---|---|
| PST 567 | 1.54 | 22% |
| 3 | 0.07 | 1% |

TABLE 5

| Sample No. | Steam Weight Loss ½" Forged Steel Bombs, 3 days @ 350° C. (grams) | % Steam Weight Loss ½" Forged Steel Bombs, 3 days @ 350° C. |
|---|---|---|
| PST 567 | 3.33 | 47% |
| 3 | 0.14 | 2% |

The results in Tables 4 and 5 indicated that at 280° C. 22% of the steam was lost and at 350° C. 47% of the steam was lost when LOCTITE PST 567 was used to seal the threads of the forged steel bomb, whereas 1% and 2%, respectively, of the steam was lost when Sample No. 3 was used to seal the threads of the forged steel bomb at those temperatures.

What is claimed is:

1. An anaerobic curable composition, comprising:
   (a) a (meth)acrylate component;
   (b) an anaerobic cure system; and
   (c) calcium fluoride present in an amount of about 10 to about 50 weight percent based on the total weight of the composition; and
   (d) a polyolefin, a halogenated polyolefin or a combination thereof, present in an amount of about 2 to about 30 weight percent based on the total weight of the composition.

2. The composition according to claim 1, wherein the (meth)acrylate component is represented by $H_2C=CGCO_2R^1$, wherein G is a member selected from the group consisting of H, halogen and alkyl having from 1 to about four carbon atoms, and $R^1$ is a member selected from the group consisting of alkyl, cycloalkyl, alkenyl, cycloalkenyl, alkaryl, and aryl groups having from 1 to about 16 carbon atoms, with or without substitution or interruption by a member selected from the group consisting of silane, silicon, oxygen, halogen, carbonyl, hydroxyl, ester, carboxylic acid, urea, urethane, carbamate, amine, amide, sulfur, sulfonate and sulfone.

3. The composition according to claim 1, wherein the (meth)acrylate component is selected from the group consisting of silicone (meth)acrylates, polyethylene glycol di(meth)acrylates, bisphenol-A-(meth)acrylates, ethoxylated bisphenol-A-(meth)acrylates, bisphenol-F-(meth)acrylates, ethoxylated bisphenol-F-(meth)acrylates, tetrahydrofuran (meth)acrylates and di(meth)acrylates, hydroxypropyl (meth)acrylate, hexanediol di(meth)acrylate, and trimethylol propane tri(meth)acrylate.

4. The composition according to claim 1, wherein the anaerobic cure system comprises a cure system selected from the group consisting of the following lettered cure systems:

A. the combination of saccharin, toluidines, acetyl phenylhydrazine, maleic acid, and quinones;

B.

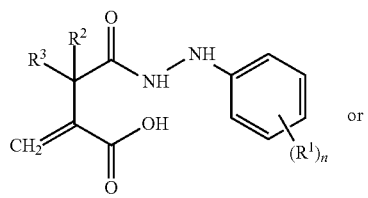

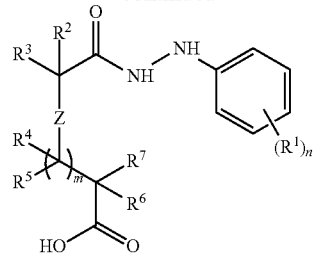

wherein $R^1$-$R^7$ are each independently selected from the group consisting of hydrogen, $C_{1-4}$ alkyl and alkoxy; Z is a carbon-carbon single bond or carbon-carbon double bond; m is 0 or 1; and n is an integer between 1 and 5;

C.

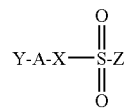

wherein Y is an aromatic ring, optionally substituted at up to five positions by $C_{1-6}$ alkyl or alkoxy, or halo groups; A is $C=O$, $S=O$ or $O=S=O$; X is NH, O or S and Z is an aromatic ring, optionally substituted at up to five positions by $C_{1-6}$ alkyl or alkoxy, or halo groups, or Y and Z taken together may join to the same aromatic ring or aromatic ring system, provided that when X is NH, o-benzoic sulfimide is excluded therefrom;

D.

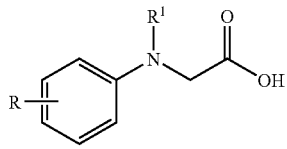

wherein R is selected from the group consisting of hydrogen, halogen, alkyl, alkenyl, hydroxyalkyl, hydroxyalkenyl, carboxyl, or sulfonato, and $R^1$ is as defined above and alkenyl, hydroxyalkyl, hydroxyalkenyl, or aralkyl;

E. trithiadiaza pentalenes represented by the following structure:

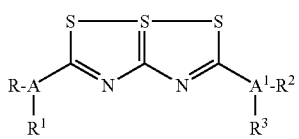

wherein A and $A^1$ are each independently selected from the group consisting of O and N; and R, $R^1$, $R^2$ and $R^3$ are the same or different, are as defined above and cycloalkyl, cycloalkenyl, and aryl, having from 1 to about 30 carbon atoms, and may be substituted or interrupted with a heteroatom, and heterocyclic structures, or $R^1$ and $R^3$ taken together may join to form a cyclic structure having from about 20 to about 28 ring atoms, and together represent dialkyl substituted polyether structures that may be substituted or interrupted with the trithiadiaza pentalene structure, which itself may or may not be substituted by $A^1$, $R^2$, or $R^3$, as defined above; and F. the combination of a triazine and a thiol.

5. The composition according to claim 1, wherein the polyolefin is a member selected from the group consisting of polyethylenes, polypropylenes, polybutylenes, copolymers thereof, and combinations thereof.

6. The composition according to claim 1, wherein the halogenated polyolefin is a member selected from the group consisting of halogenated polyethylenes, halogenated polypropylenes, halogenated polybutylenes, copolymers thereof, and combinations thereof.

7. The composition according to claim 6, wherein the halogen of the halogenated polyolefin is fluorine.

8. Reaction products of the composition according to claim 1.

9. An anaerobic curable composition, comprising:
(a) a (meth)acrylate component;
(b) an anaerobic cure system; and
(c) a compound of a Group IA or Group IIA element and a halogen, present in an amount of about 25 to about 35 weight percent based on the total weight of the composition; and
(d) a polyolefin, a halogenated polyolefin or a combination thereof, present in an amount of about 10 to about 25 weight percent based the total weight of the composition.

10. An anaerobic curable composition, comprising:
(a) a (meth)acrylate component;
(b) an anaerobic cure system; and
(c) calcium fluoride present in an amount of about 25 to about 30 weight percent, based on the total weight of the composition; and
(d) a polyolefin and a halogenated polyolefin present in an amount of about 20 to about 22 weight percent, wherein the polyolefin is present in an amount of at least 2 weight percent with a balance thereof being the halogenated polyolefin, based on the total weight of the composition.

* * * * *